July 16, 1968
K. JANNER
3,393,329
THERMIONIC CONVERTER BURNER ELEMENT
Filed March 10, 1965
3 Sheets-Sheet 1
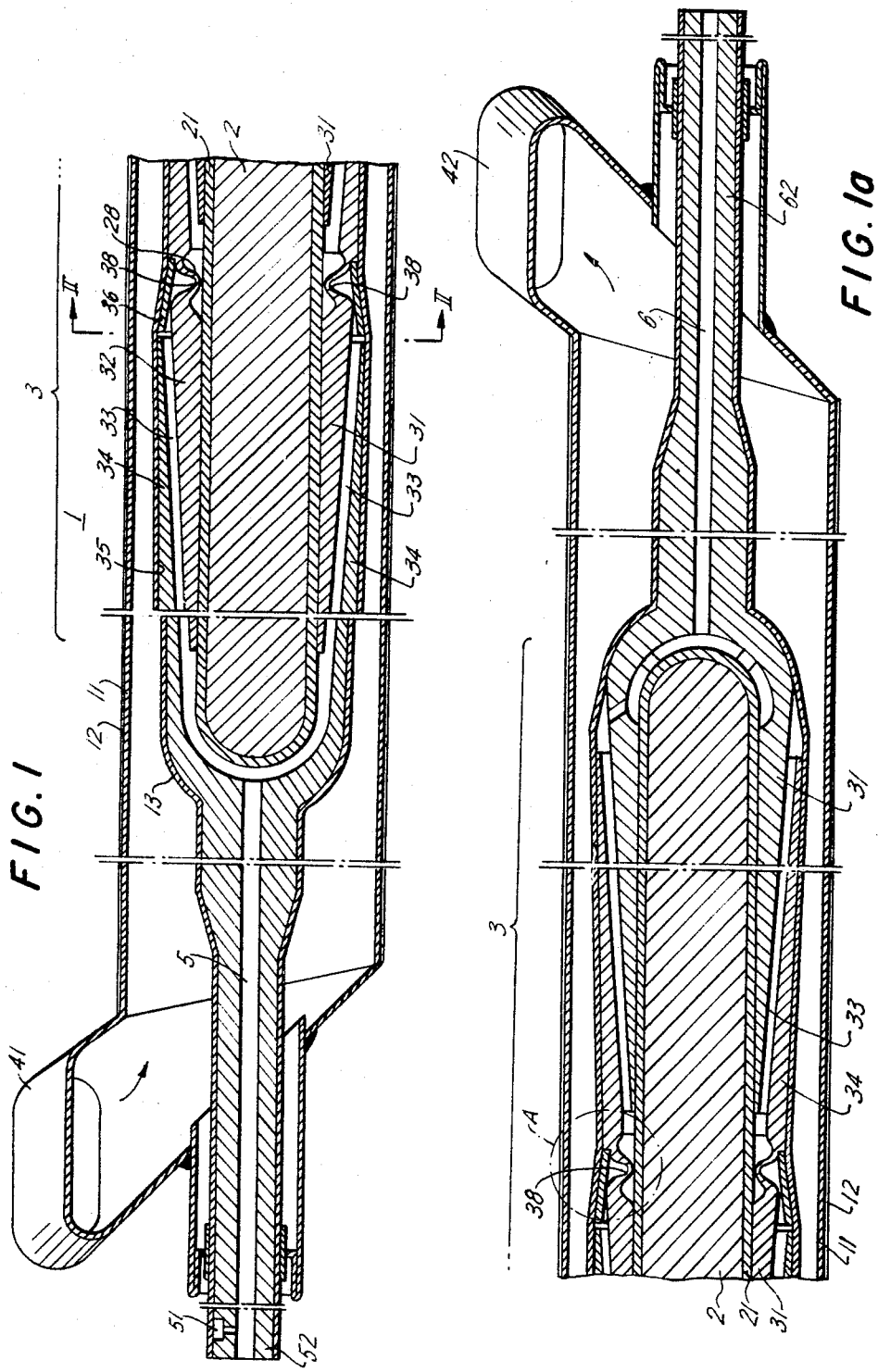

July 16, 1968 K. JANNER 3,393,329
THERMIONIC CONVERTER BURNER ELEMENT
Filed March 10, 1965 3 Sheets-Sheet 2

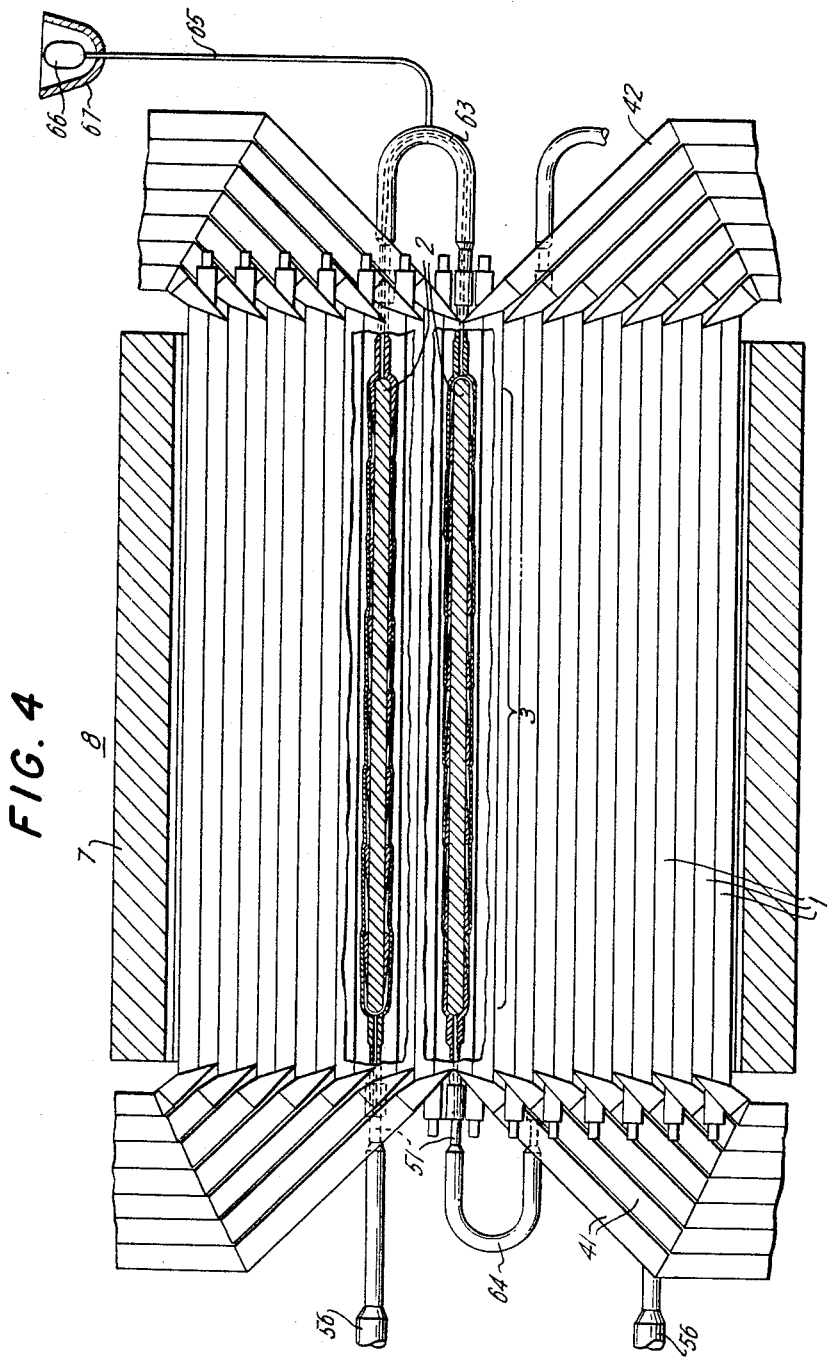

United States Patent Office 3,393,329
Patented July 16, 1968

3,393,329
THERMIONIC CONVERTER BURNER ELEMENT
Karl Janner, Erlangen, Germany, assignor to Siemens
Aktiengesellschaft, a corporation of Germany
Filed Mar. 10, 1965, Ser. No. 438,534
Claims priority, application Germany, Mar. 11, 1964,
S 89,943
15 Claims. (Cl. 310—4)

ABSTRACT OF THE DISCLOSURE

Converter burner element for directly converting heat energy from nuclear fission into electrical energy, comprising an elongated core of nuclear fuel, a plurality of serially connected thermionic diodes coaxially aligned on said core, said diodes having elongated cathodes and anodes extending in the flow direction of a plasma therebetween, the cathodes and anodes having cross sections varying at a constant rate inversely relative to one another, in said flow direction.

---

This invention relates to a converter burner element for directly converting heat energy generated by nuclear fission into electrical energy, particularly for the current supply in space vehicles having series-connected thermionic diodes.

A number of proposals have been made to convert the heat energy produced in a nuclear reactor directly into electrical energy by means of thermionic converters. Since the cell voltage of a single thermionic diode is extremely small, it being about 1 volt, the suggestion has been made to connect a number of diodes in series with the same heat source. The arrangement of cathode and anode in all of these known converters was mostly cylindrical. The constructional difficulties and requirements for maintaining the very small plasma gap as well as controlling the thermal stresses and retention of the cesium vapor pressure, were considerable. There was no provision for the discharge of the gaseous fission products formed during operation of the reactor.

It is accordingly an object of my invention to provide a converter burner element which avoids the aforementioned difficulties and disadvantages of the heretofore known devices of this general type.

A more specific object of my invention is to provide a converter burner element wherein the individual thermionic diodes are capable of operating at a very high temperature in the order of magnitude of 2200° Kelvin.

It is a further object of my invention to provide a converter burner element in which the losses varying from one to the other of the individual diodes and which result from the electrical resistance values of the cathode and anode materials existing at different temperatures, are reduced over the known burner elements of this general type.

It is another object of my invention to provide a converter burner element which can be employed with a nuclear reactor of relatively smaller critical dimensions for the same electrical losses due to the temperature differences of the cathodes and anodes as would be present in reactors of relatively larger critical dimensions employing conventional converter burner elements.

It is also an object of my invention to provide a converter burner element in which notwithstanding the fact that the space between the diodes is about 1 mm. and is therefore relatively large, the spacing is nevertheless readily controllable from a purely mechanical standpoint so that the burner element has very good operational reliability.

In order to prevent the aforementioned internal electrical losses, in accordance with my invention I provide both electrodes, i.e., the anode and the cathode, with a conical or tapering shape and select their cross section so that the voltage drop per unit of length of anode and cathode remains constant and at the same value for both electrodes in consideration of the varying specific electrical resistance for constant current density in the gap between cathode and anode due to the varying temperature and, where applicable, due to the difference in the electrode material employed. A constant voltage difference between the gap boundaries is thereby obtained. Due to the varied cathode wall thicknesses, there is very little temperature difference at the cathode surface in the longitudinal direction thereof. That temperature difference is only about 5° C. and is therefore negligible.

The cathode and anode structural components may be of the same material, such as molybdenum, for example, and may be electrically connected serially from one diode to another with bridges of good electrical conductivity and of the poorest heat conductance, the bridges being flexible in the axial direction. This construction combines an accurate centering of the components together with a practically tension-free accommodation of the longitudinal changes in the individual structural components. In addition, this ensures a sufficiently low-ohmic connection between the various diodes and limits the heat transfer between cathode and anode to a permissible value. The surfaces of these connections are also insulated by a thin, spray-deposited beryllium oxide layer or by other insulation means so that harmful currents in the limit zones between the cells or diodes may be kept at a minimum.

With these converter elements care is also taken that the cesium vapor pressure in the plasma space is always kept at the same level and that at the same time the elimination of the gaseous fission products diffusing through the space is made possible. For this purpose a number of cesium supply containers are provided which are kept by the heat conduction from the nuclear reactor at the required temperature to produce the desired cesium vapor pressure. This heat conduction is adjusted by suitable dimensioning of the thickness and length of the connecting line between burner element and cesium supply containers. At the other end of the burner element is a small outlet for discharging the cesium vapor through which the aforementioned contaminated fission products diffusing out of the interior of the element are simultaneously discharged. The cesium loss is very slight, as can be concluded from the following figures:

If about 14 mm.³ of cesium vapor having a pressure of 1 torr and a temperature of 1000° Kelvin were to flow out every second, then the yearly consumption of cesium would be only 1 g.

The contamination of the converter through fission products when solid fissionable materials are used can be considerably reduced through direct discharge of the fission products from the spaces containing the fissionable material. The anodes of the individual burner elements or thermionic converters are cooled by a liquid metal, such as sodium, natural lithium or lithium 7, for example, supplied by a pump to a radiator. In the radiator the unusable heat of the reactor, i.e. about 85 to 90% of the total heat produced, is radiated away.

The individual burner elements are connected electrically partly in series, partly in parallel, according to the voltage which is most desirable for the consumer. Of course, various differential voltages and currents, independent of one another, may likewise be derived from a nuclear reactor equipped with such converter burner elements. For this purpose as well as to protect them against possible damage from meteorites for example, when such reactor is to serve as a source of energy supply for a space vehicle, all of the burner elements are insulated from one another. Any damage causing a short circuit within a series connection of thermionic diodes in a single burner element will thus have no effect on other converter burner elements. The insulation layers necessary therefor, in turn, consist of aluminum oxide or beryllium oxide applied by a spray process.

The reactor equipped with such burner elements can be of the fast, intermediate or thermal reactor types. It is expedient to provide the individual converter burner elements with a hexagonal cross section, making possible a compact construction of the reactor core. The control of such a reactor, particularly the start-up thereof, may suitably be effected by means of a movable reflector.

The features that are considered to be characteristic for the invention are set forth in the appended claims.

Although the invention has been illustrated and described as embodied in a converter burner element, it is nevertheless not intended to be limited to the details shown, since various modifications and structural changes may be made therein without departing from the spirit of the invention and within the scope and range of equivalence of the claims.

The construction and method of operation of the invention, however, together with additional objects and advantages thereof will be best understood from the following description of a specific embodiment thereof when read in connection with the accompanying drawings, in which:

FIGS. 1 and 1a are longitudinal sectional views of respective ends of a converter burner element in accordance with the invention, with portions broken away and deleted to conserve space;

FIG. 4 is a longitudinal sectional view, partly diagrammatic, of a reactor core with converter burner elements as shown in FIGS. 1 and 1a;

Figure 3:
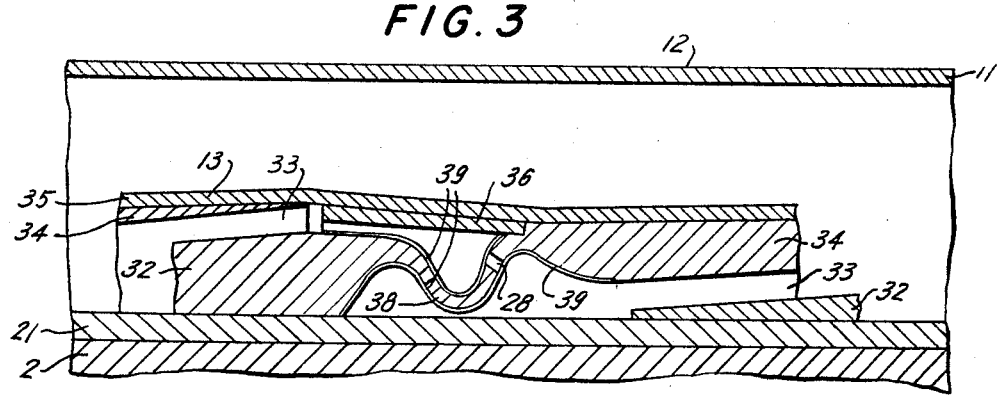
FIG. 3 is an enlarged detail of FIG. 1a in the region of the circle A showing the connection in series of two successive thermionic diodes.

Referring now to the drawings and first particularly to FIGS. 1 and 1a, there is shown a converter burner element 1 consisting of a series connection of individual thermionic diodes 31. The core of the burner element is made up of fissionable material 2 which, for instance, may consist of metallic uranium. The fissionable material is completely enclosed in a casing or cladding 21 of beryllium oxide, for example which serves simultaneously as insulator and carrier for the cathode components of the individual diode lengths 31. These cathode structural components 32 consist of molybdenum, for example, and have conical outer surfaces. These structural components 32 of the cathode are located opposite correspondingly shaped, tapering anode structural components 34 with an annular clearance 33 of uniform width therebetween providing a plasma flow path. Each cathode component 32 is connected with the anode component 34 of the neighboring diode length 31 by a membranous connecting bridge 38 (see FIG. 3). This memranous connection 38 is coated on both sides with an insulating layer 39 which can consist of sprayed-on beryllium oxide for example. The connecting membranes 38 are provided with at least one hole 28 so that uniform cesium vapor pressure can be built up in all diode lengths, permitting migration of the contaminated fission products diffusing through the cathode components.

These contaminated fission products can escape at the end of the burner element through the outlet pore 51.

Ring-shaped insulating bodies 36 are provided for the approximate adjustment of the distance between the individual diode elements 31. They are, however, loosely seated so that no stresses can arise due to thermal expansion of the individual diode components. At one end of the burner element the anode component 34 merges into an electrical supply line 52 provided with a channel 5 communicating with the outlet pore 51. At the other end of the burner element, the cathode component 31 of the last diode element merges into the electrical supply line 62 which is provided with a bore 6 that is connected, as shown in FIG. 4, with the supply line 65 for the cesium receptacle 66.

This series connection of thermionic diodes 31 is in turn surrounded first of all by an insulating layer 35 of beryllium oxide, for instance, on which a metallic coating 13 of molybdenum, for example, is applied, which can be brought into good heat-conducting contact with the insulating layer, for instance in the drawing process by means of inductive high-frequency heating. Another possible method of applying the metallic coating 13 could be by electrolytic deposition or spray depositing with subsequent densification by fusing. This gives rise to a stable and dense element toward the outside. However, since the coefficient of expansion of beryllium is somewhat higher than that of the molybdenum used, very good heat-conducting contact is retained during the operation between the charge of fissionable material and these surrounding thermionic diodes.

The element just described, consisting of the heat source (the nuclear fuel) and the series connection of thermionic diodes, is located within a hexagonal casing tube 11, again consisting of molybdenum, for example, which is externally covered with an insulating layer 12 of beryllium oxide, for example. In the interspace thus formed between the tubular coating 13 and the outer tube 11, flows the coolant for the anodes which can consist of a liquid metal such as natural lithium, lithium 7 or sodium. The hexagonal casing tube 11 is closed off at both ends by a laterally connected coolant supply line 41 and discharge line 42. The electrical supply lines 52 and 62 sealingly pass through the lateral coolant line connections 41, 42.

Figure 5:
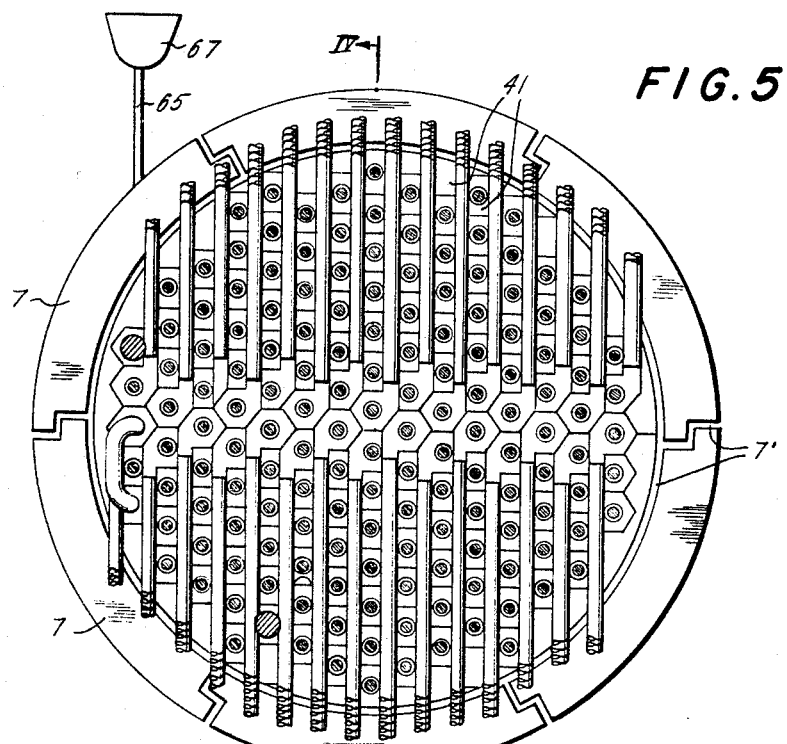
FIG. 5 is an end view of FIG. 4 as seen from the left-hand side thereof.
Figure 2:
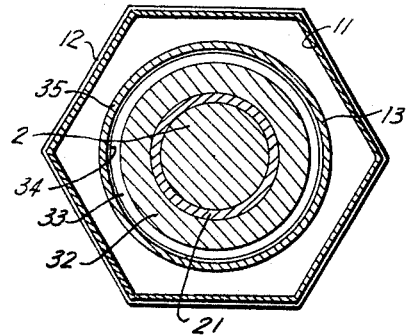
FIG. 2 is a transverse sectional view of FIG. 1 taken along the line II—II in the direction of the arrows.

FIGS. 4 and 5 show a reactor core assembled with the converter burner elements of FIGS. 1 and 1a. The converter burner elements are arranged close together in the core space and interconnected by electrical feeder lines 63 and 64. The positioning of these connecting lines 63, 64 is through the laterally projecting coolant supply and discharge lines 41, 42, as clearly shown in FIG. 5. The cesium supply receptacle 66 is provided with a heat screen 67 and connected with the electrical feeder line 63 through a line 65, thereby serving two converter burner elements. The outlet lines for the electrical energy that is produced are designated by 55 and 56. The entire reactor core is surrounded by a reflector 7 which, as shown in FIG. 5, is provided with partitioning joints 7', so that for purposes of adjustment, the distance of the reflector 7 from the reactor core can be altered.

Figure 6:
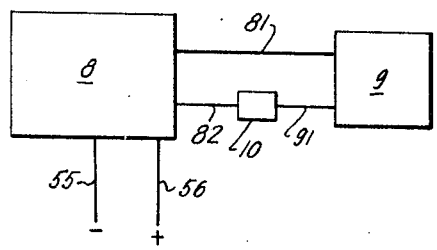
FIG. 6 is a diagrammatic view of the interconnection of core reactor, coolant pump and radiator as employed, for example, in supplying energy in a space vehicle.

FIG. 6 is a diagrammatic functional representation of a plant for the production of energy, for example for space travel purposes. As shown in FIG. 6, the nuclear reactor is designated by 8. The coolant passes through the lines 81 to the radiator 9, thence over the line 91 to the pump 10 and then back into the nuclear reactor through the line 82. This coolant circulation loop is generally not provided as a common circuit or loop for all of the converter burner elements, but rather, separate circulation loops for each one or for groups of a very few converter burner elements are provided. This is necessary so that any damage, for example by meteorites, should have a negligible effect on the entire plant. In FIG. 6, the output current outlet lines are again designated by 55 and 56.

In accordance with the power output of the reactor, it is possible to operate with one or more radiators which radiate the heat into free space and whose surface possesses a large emission ratio. In an energy supply plant of this type consisting of a nuclear reactor and two radiators, it is expedient to arrange one radiator in front and one behind the nuclear reactor, from the viewpoint of the travel direction of the space craft. The coolant lines in the radiator proper are of hairpin shape and are in each case connected to a converter burner element of the reactor. In this manner it is feasible to combine in each case two converter burner elements and one coolant line loop in both radiators as well as one coolant pump into a closed coolant circuit. It should be noted in this connection that it is naturally also expedient to insulate electrically from one another the surface areas of the radiator belonging to the individual closed cooling circuits, so that from the viewpoint also, the effects of any possible damage may remain negligibly small.

Several specific values will afford a better spatial conception of the dimensions of such a converter burner element. Its length can be, for example, about 600 mm. and its diameter about 26 mm. The gap between the cathode and the anode structural components of the individual thermionic diode sections 31 is in the order of magnitude of 1 mm. The burner element is made up of a series connection of eight to ten of such diodes, for example. The diameter of the core of fissionable material, i.e. of the source of heat proper for this converter burner element, is in this example about 10 mm. The diameter of a reactor containing about 300 to 400 of such converter burner elements is of the order of magnitude of 50 cm. The pumps 10 may be electrodynamic pumps of even pumps having movable parts of conventional commercial construction. The temperature at the cathode structural components is about 2000° C. and at the anode structural components about 730° C.; the coolant outlet temperature then is about 700° C.

Such converter burner elements or nuclear reactors for supplying energy in space vehicles are especially reliable in their operating environment because, for example, the maintenance of the vacuum in the annular slot or gap of the individual thermionic diodes is no problem in a space environment, and the fission products can be released into the environment without hesitation.

The present invention is naturally not restricted to the material data indicated; other metals and insulating materials such as $Al_2O_3$ can be used. It is also conceivable to make suitable modifications according to the particular application of the converter burner element and the type of reactor utilized.

I claim:

1. Converter burner element for directly converting heat energy from nuclear fission, into electrical energy, comprising an elongated core of nuclear fuel, a plurality of serially connected thermionic diodes coaxially aligned on said core, said diodes having elongated cathodes and anodes extending in the flow direction of a plasma therebetween, said cathodes and anodes having cross sections varying at a constant rate inversely relative to one another, in said flow direction.

2. Converter burner element for directly converting heat energy from nuclear fission into electrical energy, comprising an elongated core of nuclear fuel, a plurality of serially connected thermionic diodes coaxially aligned on said core, each of said diodes having an elongated cathode and anode spaced from one another and defining therebetween an elongated plasma flow path, said cathode and anode having cross-sectional areas varying at a constant rate inversely relative to one another in the direction of said flow path.

3. Converter burner element for directly converting heat energy from a nuclear fission into electrical energy, comprising an elongated core of nuclear fuel, a plurality of serially connected thermionic diodes coaxially aligned on said core, each of said diodes having a pair of elongated electrodes consisting of a cathode and anode spaced from one another and defining therebetween an elongated plasma flow path, one electrode of each diode having a constantly increasing cross section and the other electrode of said diode having a constantly decreasing cross section in the direction of said flow path.

4. Converter burner element for a nuclear reactor for directly converting heat energy from nuclear fission into electrical energy, comprising an elongated core of fissionable nuclear fuel material adapted to be molten at operating temperature of the nuclear reactor, a plurality of serially connected substantially cylindrical thermionic diodes surrounding and extending end to end along said elongated fuel core, each of said diodes having a pair of elongated electrodes consisting of a cathode and anode spaced from one another, the cathodes and anodes of said diodes defining therebetween an elongated plasma flow path extending substantially in the longitudinal direction of said fuel core, one electrode of each diode having a constantly increasing cross section and the other electrode of said diode having a constantly decreasing cross section in said longitudinal direction.

5. In a nuclear reactor, a converter burner element for directly converting heat energy from nuclear fission into electrical energy, said burner element comprising an elongated core of nuclear fuel, a plurality of serially connected thermionic diodes coaxially aligned on said core, each of said diodes having a pair of elongated electrodes consisting of a cathode and anode spaced from one another, the cathodes and anodes of said diodes defining therebetween an elongated plasma flow path, one electrode of each diode having a constantly increasing cross section and the other electrode of said diode having a constantly decreasing cross section in the direction of said flow path, and means for cooling said burner element.

6. Nuclear reactor according to claim 5, wherein said cooling means comprises a liquid metal selected from the group consisting of natural lithium, lithium 7 and sodium.

7. Converter burner element for directly converting heat energy from nuclear fission into electrical energy, comprising an elongated core of nuclear fuel, a plurality of elongated thermionic diodes located end to end coaxially aligned on said core, each of said diodes having a pair of elongated electrodes consisting of a cathode and anode spaced from one another, the cathodes and anodes of said diodes defining therebetween an elongated plasma flow path, one electrode of each diode having a constantly increasing cross section and the other electrode of said diode having a constantly decreasing cross section in the direction of said flow path, the cathode of one diode being connected to the anode of an adjacent diode by a connective membrane whereby said diodes are serially connected.

8. Converter burner element for directly converting heat energy from nuclear fission into electrical energy, comprising an elongated core of nuclear fuel, a plurality of elongated thermionic diodes located end to end coaxially aligned on said core, each of said diodes having a pair of elongated electrodes consisting of a cathode and anode spaced from one another, the cathodes and anodes of said diodes defining therebetween an elongated plasma flow path, one electrode of each diode having a constantly increasing cross section and the other electrode of said diode having a constantly decreasing cross section in the direction of said flow path, the cathode of one diode being connected to the anode of an adjacent diode by a connective membrane whereby said diodes are serially connected, the connective membranes between adjacent diodes extend transversely to said flow path and are covered on both sides with insulating material, said membranes being formed with openings for passage of plasma along said flow path.

9. In a nuclear reactor, a plurality of converter burner elements for directly converting heat energy from nuclear fission into electrical energy, each of said burner elements comprising an elongated core of nuclear fuel, a plurality of serially connected thermionic diodes coaxially aligned on said core, each of said diodes having a pair of elongated electrodes consisting of a cathode and anode spaced from one another, the cathodes and anodes of said diodes defining therebetween an elongated plasma flow path, one electrode of each diode having a constantly increasing cross section and the other electrode of said diode having a constantly decreasing cross section in the direction of said flow path, and each of a plurality of plasma seed material supply means and a plurality of coolant loop systems connected to at least one of said burner elements.

10. Nuclear reactor according to claim 9, wherein each of said plasma seed material supply means and said coolant loop systems are connected to respective groups of said burner elements.

11. Nuclear reactor according to claim 9 wherein said plasma seed material supply means comprises a receptacle containing a supply of cesium, said receptacle being connected to the respective burner element by a connecting line of suitable dimension for conducting an amount of heat from said burner element to said receptacle for maintaining said receptacle at a temperature related to the desired cesium vapor pressure, and screening means for shielding said receptacle from other heat sources.

12. Nuclear reactor according to claim 9 for use in a space vehicle, wherein said burner element is provided with an outlet opening for discharging into surrounding space gaseous fission products penetrating into said plasma flow path.

13. Converter burner element according to claim 3 wherein the burner element has a hexagonal cross section.

14. Nuclear reactor according to claim 5 wherein said cooling means comprises a casing of substantially hexagonal cross section surrounding and spaced from said burner element and defining therebetween a channel for a liquid metal coolant.

15. Converter burner element for directly converting heat energy from nuclear fission into electrical energy, comprising an elongated container, a supply of fissionable nuclear fuel material received in said container, a plurality of serially connected substantially cylindrical thermionic diodes surrounding and extending end to end along said elongated fuel container, each of said diodes having a pair of elongated, substantially cylindrical electrodes consisting of a cathode and an anode located coaxial to and radially spaced from one another, the cathodes and anodes of said diodes defining therebetween an elongated plasma flow path extending substantially in the longitudinal direction of said fuel container, one substantially cylindrical electrode of each diode having an external taper and the other substantially cylindrical electrode of said diode having an internal taper corresponding to said external taper whereby said one electrode has a constantly decreasing cross section and said other electrode has a constantly increasing cross section in the longitudinal direction of said fuel container.

References Cited
UNITED STATES PATENTS

| | | | |
|---|---|---|---|
| 3,113,091 | 12/1963 | Rasor et al. | 310—4 |
| 3,179,822 | 4/1965 | Block | 310—4 |
| 3,201,619 | 8/1965 | Gleason et al. | 310—4 |
| 3,211,930 | 10/1965 | Clement et al. | 310—4 |

REUBEN EPSTEIN, *Primary Examiner.*